J Underwood,
Steam-Engine Piston.

Nº 16,202.    Patented Dec. 9, 1856.

UNITED STATES PATENT OFFICE.

JOHN UNDERWOOD, OF LOWELL, MASSACHUSETTS.

CYLINDER AND PISTON OF HYDRAULIC AND STEAM ENGINES.

Specification of Letters Patent No. 16,202, dated December 9, 1856.

*To all whom it may concern:*

Be it known that I, JOHN UNDERWOOD, of Lowell, in the county of Middlesex and State of Massachusetts, have invented a new and useful Improvement in Cylinders and Pistons of Engines, it being applicable both to hydraulic and steam engines; and I do hereby declare that the following is a full, clear, and exact description of the construction and operation of the same, reference being had to the annexed drawings, making a part of this specification, in which—

Figure 1:
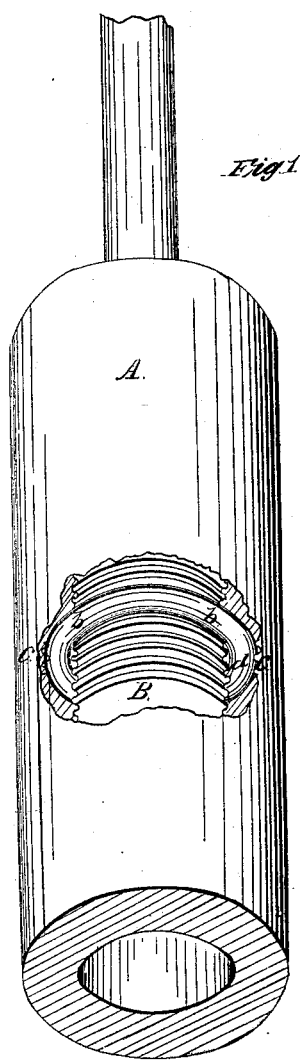
Figure 3:
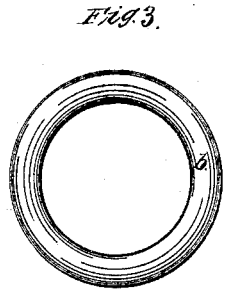
Figure 2:
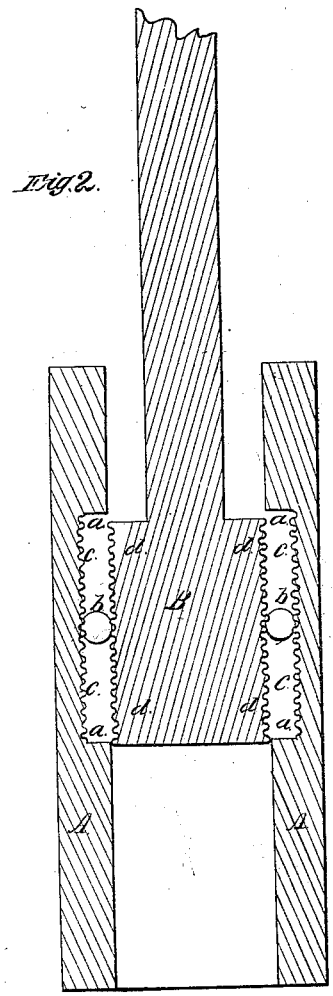

Figure 1 is a perspective view, and Fig. 2 is a sectional view, and Fig. 3 is a view of the cylindrical ring of india-rubber or other elastic substance.

The same letters are used in each figure to represent the same part.

A, is the cylinder of the pump or engine which is made the same as the common cylinder except making a chamber in it as represented at $a$, $a$, $a$, $a$, and also making grooves around the inner surface of the chamber at $c$, $c$, $c$, $c$. Now while the diameter of the bore of this cylinder is just large enough to allow the piston head to play freely through it the chamber is enough larger to admit of the cylindrical ring $b$ to play between it and the piston as seen at $b$, in Figs. 1 and 2. And the length of this chamber must be about one-half the length of stroke of the engine added to the diameter of the wire of the cylindrical ring. In an engine or pump of two feet stroke I make the cylinder about three feet long. I make the grooved chamber, the diameter of the wire of the ring more than one foot long and this chamber midway between the two ends of the cylinder and the piston must be of the same length as the chamber of the cylinder these proportions will be found in practice nearly correct. The piston B, must be made a little more than one half of the length stroke with grooves around it as shown at $d$, $d$, $d$, $d$, Figs. 1 and 2 and the diameter of the piston is such that it will fill the ring when in the chamber of the cylinder and give the ring a proper pressure.

The grooves $c$, $c$, around the cylinder and $d$, $d$, around the piston act as and are equivalent to the teeth of a rack while the elastic ring $b$, is pressed between them and partly into the grooves making it perform the office of or act as a pinion, the object of which construction or arrangement is to prevent the pressure of the water or steam on the ring from sliding on it.

The object of having the diameter of the two ends less than the middle of the cylinder is to have the space around the piston filled so as to prevent the space being filled with water or steam from which we should get no benefit.

What I claim and desire to secure by Letters Patent on as my invention is—

The cylinder and piston made as above described and for the purpose set forth.

JOHN UNDERWOOD.

Witnesses:
  J. H. MERRILL,
  JOHN S. HOLLINGSHEAD.